United States Patent [19]

Back-Pedersen et al.

[11] Patent Number: 5,031,468
[45] Date of Patent: Jul. 16, 1991

[54] FLOW METER WORKING ON THE CORIOLIS PRINCIPLE (III)

[75] Inventors: Andreas Back-Pedersen, Valby; Ole B. Nielsen, Sonderborg; Hans C. Moller, Augustenborg, all of Denmark

[73] Assignee: Danfoss A/S, Nordborg, Denmark

[21] Appl. No.: 631,745

[22] Filed: Dec. 20, 1990

Related U.S. Application Data

[63] Continuation of Ser. No. 565,909, Aug. 10, 1990, abandoned, which is a continuation of Ser. No. 383,649, Jul. 24, 1989, abandoned.

[30] Foreign Application Priority Data

Aug. 26, 1988 [DE] Fed. Rep. of Germany ....... 3229061

[51] Int. Cl.$^5$ .............................................. G01F 1/84
[52] U.S. Cl. ................................................ 73/861.38
[58] Field of Search ......................... 73/861.37, 861.38

[56] References Cited

U.S. PATENT DOCUMENTS

| | | | |
|---|---|---|---|
| 4,311,054 | 1/1982 | Fox et al. | 73/861.38 |
| 4,711,132 | 12/1987 | Dahlin | 73/861.38 |
| 4,730,501 | 3/1988 | Levien | 73/861.38 |
| 4,756,198 | 7/1988 | Levien | 73/861.38 |

Primary Examiner—Herbert Goldstein
Attorney, Agent, or Firm—Wayne B. Easton; Clayton R. Johnson

[57] ABSTRACT

In a flow meter that works on the Coriolis principle there is provided a single tube that is bent to have two measuring loops. Upper and lower tube attachment end portions are respectively connected through resilient tubular portions to the opposite ends of the two loops and may be part of the single tube. The loops are superposed and from the juncture of the loops and through at least parts of the attachment end portions are of a continuous downward gradient such that the fluid column in the flow meter will divide and drain through the attachment end portions. Two blocks have tube holder portions for retaining the loop first ends and the measuring loops opposite ends in vertical spaced relationship and connecting the attachment end portions together. The measuring loops are oscilatable in opposite directions while sensors are provided adjacent to the measuring loops for measuring the relative movement of the loops relative to one another to provide a measurement of the fluid flow through the loops.

7 Claims, 1 Drawing Sheet

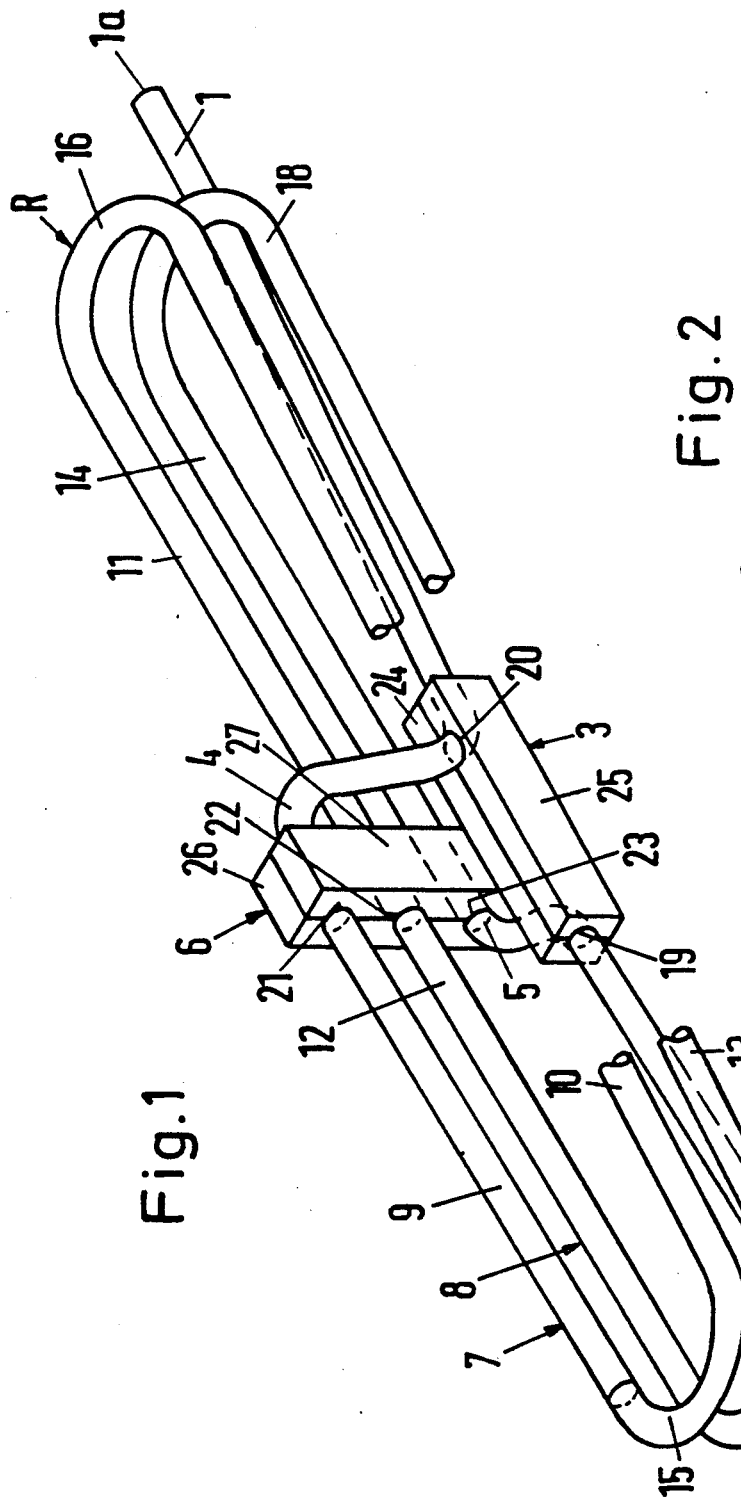
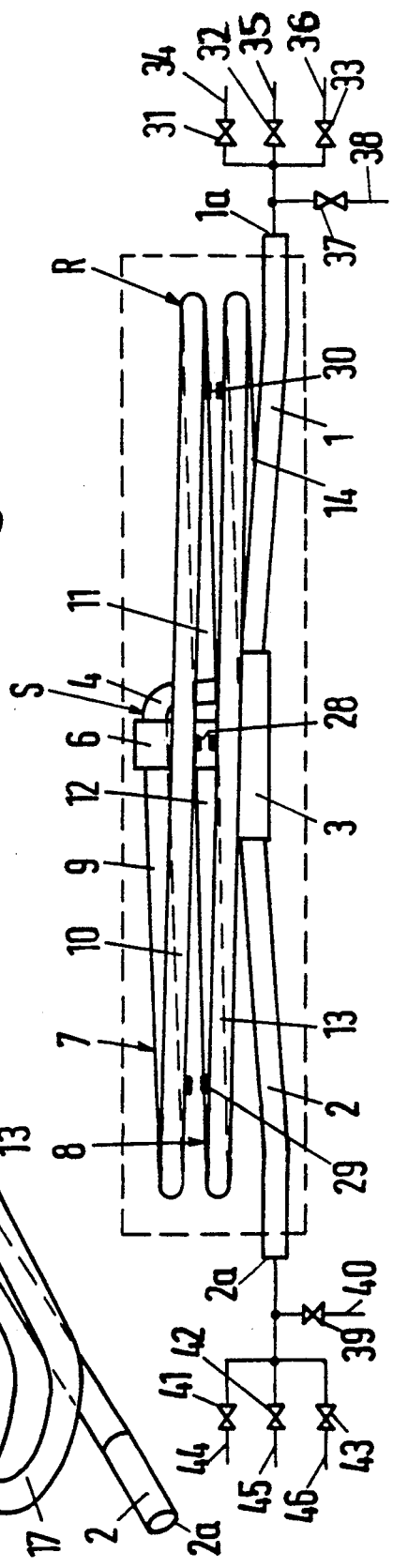

FLOW METER WORKING ON THE CORIOLIS PRINCIPLE (III)

This application is a continuation of application Ser. No. 565,909, filed Aug. 10, 1990, now abandoned; which is a continuation of Ser. No. 383,649 filed July 24, 1989, now abandoned.

The invention relates to a flow meter working on the Coriolis principle comprising an attachment apparatus connected on the one side to an upstream and a downstream attachment tube and on the other side to adjacent measuring tube loops which can be oscillated in opposite senses by an oscillator and are provided with sensors for receiving a measurement depending on the relative movement Equipment of this kind is known, for example, from DE-AS 28 22 087 (corresponds to U.S. Pat. No. 4,127,028) or EP-OS 239 679. The measuring tube loops are disposed in two parallel planes which are either superposed or juxtaposed.

If one wishes to send different media through the meter in succession, one encounters the difficulty on change-over that the old medium will mix with the new medium. This can lead to disruptive reactions, precipitation and the like.

The invention is based on the problem of providing a meter of the aforementioned kind that can be completely emptied to avoid such mixing.

This problem is solved according to the invention in that the measuring tube loops are superposed and that a continuous gradient is provided from one end of each loop to the other.

By reason of the fact that there is a continuous gradient within each measuring tube loop, the loop can be easily emptied. It is merely necessary to provide the lower end with a discharge. Subsequently, the new medium can be introduced without mixing with the old medium.

It is desirable for the superposed measuring loops to be connected in series. One will then have a continuous gradient over both loops.

Preferably, there are two gradient sections leading from a point of maximum height to one of the two attachment ends. If both attachment ends are provided with a discharge, the fluid column divides substantially in the region of maximum height and emptying takes place to both sides.

It is of particular advantage for the measuring tubes and the attachment tubes to be formed by a single tube which is bent several times and of which given sections are secured to the attachment apparatus. Such a single tube simplifies production and assembly It has the same cross-section throughout and forms no pockets in which dirt can collect. Further, in contrast with assembled tube sections, it is not necessary to take precautions about sealing the tube section ends.

It is advisable for the attachment apparatus to comprise segmented tube holders for receiving the given single tube sections The single tube sections are simply inserted in one part of the tube holder. The other part Is then placed above it and the two parts are interconnected, which can be done by welding, soldering, adhesion, screws or even a friction connection, depending on the nature of the material Advantageously, the ends of the two measuring tubes are fixed in three superposed tube holders. This simple feature deforms the measuring tube loops spirally to produce the desired throughgoing gradient.

In one preferred embodiment, the attachment apparatus comprises a first block connected to the attachment tubes, a second block connected to the measuring tube loops, and at least one pair of resilient connecting tubes between the two blocks, the second block comprising three superposed and parallel tube holders which receive the ends of the measuring tube loops and the connecting tubes. The use of the connecting tubes keeps external influences such as clamping forces or torques, vibrations and the like away from the second block and the measuring tube loops secured therein. This leads to a high measuring accuracy. In addition, the blocks can be comparatively light in weight so that they will rapidly follow temperature changes in the fluid. In connection with single tube clamping, the length of the tube holders can be kept extremely short so that the changes in length of the second block occuring through temperature changes are negligible.

In particular, the first block may be disposed at the lower end of the second block and be provided with the attachment tubes at its opposed end faces, with a lower connecting tube at one side face, and with an upper connecting tube at its top. This results in a compact construction with a short rising tube.

From a constructional point of view, it is advisable that the measuring tube loops should consist of straight tube sections substantially parallel in the vertical projection to each other and to the attachment tubes, which sections are interconnected by 180° bends, and that the first block should lie within the loop projection. This results in an elongate meter requiring a comparative small cross-sectional space and therefore being adapted for building into a protective tube. The construction with straight tube sections is likewise very simple when making from a single tube because only few bends have to be provided.

A preferred example of the invention will now be described in more detail with reference to the drawing wherein:

FIG. 1 is a perspective view of a flow meter according to the invention, and

FIG. 2 is a side elevation with diagrammatically illustrated other parts

The illustrated flow meter has an upstream attachment tube 1 and a downstream attachment tube 2 which could be provided with a flange and lead from outer attachment ends 1a and 2a to opposite ends of a first block 3. The latter is connected to a second block 6 by way of two resilient connecting tubes 4 and 5. The second block has two superposed measuring tube loops 7 and 8 secured to it. These each consist of three straight tube sections 9, 10 and 11 or 12, 13 and 14 and two 180° bends 15 and 16, 17 and 18. As shown in FIG. 2, there is a continuous gradient to both sides of the highest point S.

The entire tube formation is bent from a single tube R and is held in the correct position by the two blocks 3 and 6. For this purpose, the block 3 forms two tube holders 19 and 20 whilst the block 6 forms three tube holders 21, 22 and 23. The latter consist of three parallel apertures whilst the former have a curved configuration. To enable the appropriate tube sections to be inserted in the tube holders, the block 3 consists of a rear portion 24 and a front portion 25, the separating line passing through the two tube holders 19 and 20. The block 6 consists of a rear portion 26 and a front portion 27 of which the separating line again goes through the three tube holders 21, 22 and 23. During production, the tube R is first bent. The tube sections to be fixed are then one-sidedly placed in one block portion. Thereupon the other block portion is laid over it and the whole is interconnected.

In the middle of the sections 10, 13, the two measuring tube loops 7 and 8 possess an oscillator 28 and near the ends of these tube sections they have sensors 29 and 30 for determining a measurement which depends on the oscillating movement.

To enable various media to be measured, the attachment tube 1 can be connected by valves 31, 32 and 33 to tubular conduits 34, 35 and 36, respectively. A further valve 37 serves to connect to a discharge 38 through which air can also enter. The attachment tube 2 is connected by way of a valve 39 to a discharge 40 through which air can also enter and by way of three valves 41, 42 and 43 to conduits 44, 45 and 46, respectively.

It is assumed that the flow of a liquid is being measured that is supplied through the conduit 34 and taken away through the conduit 44. To change to a different liquid, the valves 31 and 41 are first closed and the valves 37 and 39 opened. Consequently, the meter can be emptied through the discharges 38 and 40, the liquid column being parted in the region of the highest point S. Thereafter, the valves 37 and 39 are closed and the valves 32 and 42 opened. A different liquid can now flow from the conduit 35 by way of the meter to the conduit 45.

Naturally, this principle is also suitable for differently formed measuring tube loops, for example loops bent into a circle or into the shape of a tennis racket. Also, the loops need not extend to both sides of a block. They could both be completely disposed on one side of this block, as is known in the prior art. For emptying, the valve can also be connected to a source of slight overpressure.

For further details, attention is drawn to the applicants' applications having the same title "Flow meter working on the Coriolis principle" (I), (II) and (IV).

We claim:

1. A flow meter working on the Coriolis principle, comprising a tubular upstream attachment end portion, a tubular downstream attachment end portion, a tube having a first measuring loop that has a first end and an opposite end, and a second measuring loop having a first end and an opposite end, and a second measuring loop having a first end and an opposite end joined to the first loop opposite end, first tubular means for joining the upstream end portion to the first loop first end, second tubular means for joining the second loop first end to the downstream end portion, the measuring loops having several bends and one loop above the other to have a continuous gradient in a downward direction from the first loop first end to the first loop opposite end and the second loop from the first loop opposite end to the second loop first end, and being oscillatable in the opposite sense relative to one another, sensor means located adjacent to the measuring loops for providing a measurement that depends on motion of the measuring loops that are being oscillated, oscillator means adjacent to the measuring loops for oscillating the loops in the opposite sense relative to one another, and attachment means for connecting the upstream and downstream attachment end portions to one another, and the first end second loops to one another while permitting the loops being oscillated relative to one another, each of the attachment end portions having a first end remote from their juncture with the respective tubular means, the upstream attachment end portion and the first tubular means being of a continuous downward gradient from the first loop first end to the upstream attachment end portion end, and the downstream attachment end portion and the second tubular means being of a continuous downward gradient from the second loop first end to the downstream attachment end portion end.

2. A flow meter according to claim 1, characterized in that the measuring loops are joined to one another in series.

3. A flow meter working on the Coriolis principle, comprising a tubular upstream attachment end portion, a tubular downstream attachment end portion, a tube having a first measuring loop that has a first end and an opposite end, and a second measuring loop having a first end and an opposite end joined to the first loop opposite end, first tubular means for joining the upstream end portion to the first loop first end, second tubular means for joining the second loop first end to the downstream end portion, the measuring loops having several bends and the first loop above the other to have a continuous gradient in a downward direction from the first loop first end to the first loop opposite end and the second loop from the first loop opposite end to the second loop first end, and being oscillatable, oscillator means adjacent to the measuring loops for oscillating them in the opposite sense relative to one another, sensor means located adjacent to the measuring loops for providing a measurement that depends on motion of the measuring loops when being oscillated, and attachment means for connecting the upstream and downstream attachment end portions to one another, and the first and second loops to one another while permitting the loops being oscillated relative to one another, the attachment means including a first block having three superposed tube holder portions for retaining the first ends and the juncture of the opposite ends of the loops in fixed relationship.

4. A flow meter working on the Coriolis principle comprising, a tubular upstream attachment end portion, a tubular downstream attachment end portion, the attachment portions having straight sections, a tube having a first measuring loop that has a first end and an opposite end, and a second measuring loop having a first end and an opposite end joined to the first loop opposite end, first tubular means for joining the upstream end portion to the first loop first end, second tubular means for joining the second loop first end to the downstream end portion, the measuring loops having several bends and the first loop above the other to have a continuous gradient in a downward direction form the first loop first end to the first loop opposite end and the second loop from the first loop opposite end to the second loop first end, and being oscillatable, the measuring loops consisting of straight tube sections that in vertical projection are substantially parallel to each other and the respective attachment portion straight section, the bends extending through 180 degrees and interconnecting the loop straight sections, there being at least three loop straight sections, oscillator means adjacent to the measuring loops for oscillating the loops in the opposite sense relative to one another, sensor means located adjacent to the measuring loops for providing a measurement that depends on motion of the measuring loops when being oscillated, and attachment means for connecting the upstream and downstream attachment end portions to one another, and the first and second loops to one another while permitting the loops being oscillated relative to one another, the attachment means including a block at least partially disposed in the loops and connected to three loop straight sections for retaining the three straight loops in superposed vertical relationship.

5. A flow meter working on the Coriolis principle, comprising a tubular upstream attachment end portion, a tubular downstream attachment end portion, a tube having a first measuring loop that has a first end and an opposite end, and a second measuring loop having a first end and an opposite end joined to the first loop opposite end, first tubular means for joining the upstream end portion to the first loop first end, second tubular means for joining the second loop first end to the downstream end portion, the measuring loops having several bends and the first loop above the other to have a continuous gradient in a downward direction form the first loop first end to the first loop opposite end and the second loop from the first loop opposite end to the second loop first end, and being oscillatable, oscillator means adjacent to the measuring loops for oscillating them in the opposite sense relative to one another, sensor means located adjacent to the measuring loops for providing a measurement that depends on motion of the measuring loops when being oscillated, and attachment means for connecting the upstream and downstream attachment end portions to one another, and the first and second loops to one another while permitting the loops being oscillated relative to one another, the loops, the tubular means and the attachment portions being formed from a single tube that has several of the bends and has straight tube sections supported by the attachment means, the attachment means including segmented tube holders for holding at least some of the tube sections.

6. A flow meter according to claim 1, characterized in that the segmented tube holders comprises a first block connecting the attachment end portions and a second block, that each of the tubular means includes a resilient connecting tube portion that extends between the blocks and has an end connected to the respective loop first end, the second block having three superposed straight and parallel tube holder portions for retaining the loop first ends and the juncture of the opposite ends of the loops in fixed vertical relationship.

7. A flow meter according to claim 6, characterized in that the second block has a lower end and that the first block is disposed at the lower end of the second block and has opposite end faces with the attachment end portions extending away therefrom, a side face having a lower connecting tube portion extending away therefrom and a top face having an upper tube portion extending away therefrom, the lower and the upper tube portions constituting at least part of the resilient connecting tube portions.

* * * * *